United States Patent Office 3,018,287
Patented Jan. 23, 1962

3,018,287
OPTICAL BRIGHTENERS FOR USE WITH PAPER
Fritz Fleck, Bottmingen, Switzerland, assignor, by mesne assignments, to Fidelity Union Trust Company, executive trustee under Sandoz Trust
No Drawing. Filed Nov. 3, 1959, Ser. No. 850,524
Claims priority, application Switzerland Nov. 5, 1958
9 Claims. (Cl. 260—240)

Ditriazyl derivatives of 4,4'-diaminostilbene-2,2'-disulfonic acid have heretofore been employed for the optical brightening of textiles, paper, etc. In those compounds used for brightening cellulose, the triazine rings are generally substituted by amine groups. With the sized paper materials which are frequently employed today in the manufacture of paper, most of the presently known brighteners—and particularly those with the best brightening action—are bound up with the deficiency, when applied in the so-called "size press," that instead of brightening the paper, they impart a dirty green discoloration thereto so that the degree of whiteness is actually reduced. These discolorations are, on the one hand, due to the low pH—about 4.5–5.0—on the surface of the paper and, on the other hand, to the action of the sizing, which conventionally is carried out with resin milk ("Harzmilch") and aluminum sulfate.

A primary object of the present invention is the obviation of this difficulty. According to the invention, this object is achieved by the provision of a new group of compounds—derivatives of 4 4'-bis-(2,4-diamino-1,3,5-triazyl - (6) - amino) - stilbene - 2 2' - disulfonic acid wherein at least one hydrogen atom of at least one amino group of the triazine rings is replaced by a cyanoalkyl group. These new compounds are valuable brighteners which do not prejudicially exhibit the aforementioned disadvantage of green discoloration of paper in the "size press."

The new compounds of the invention are represented by the following formula

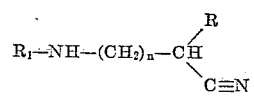

(1)

wherein each of X, Y and Z is an amino radical which may be identical with V attached by the amino nitrogen to the adjacent triazine ring and wherein each of X, Y and Z may be $NH_2$, R stands for hydrogen or methyl, $R_1$ stands for hydrogen, alkyl or hydroxyalkyl or lower alkoxyalkyl (the $R_1$ alkyl group containing 1 to 4 carbon atoms), and $n$ represents zero or one. The water-soluble salts of these compounds are also included in the scope of this invention.

The essential and characteristic moiety of compounds I is the

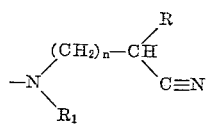

group V, wherein R, $R_1$ and $n$ are as precedingly defined, and the presence of at least one such moiety is indispensible to the desired results. The moieties X, Y and Z, on the other hand, are widely variable and, except as they may be identical with V, have been used as substituents on the triazyl radicals in the general type of compound here involved.

These new compounds I can be prepared by reacting, in any order of succession, 2 mols of cyanuric chloride with:

(a) 1 mol of 4,4'-diaminostilbene-2,2'-disulfonic acid or a salt thereof,
(b) 1 to 4 mols of one or more cyanoalkylamines of the formula $$R_1-NH-(CH_2)_n-CH\begin{smallmatrix}R\\ \\C\equiv N\end{smallmatrix}$$

wherein R, $R_1$ and $n$ are as precedingly defined, and
(c) 0 to 3 mols of one or more primary or secondary amines or of ammonia, the total number of mols in (b)+(c) being four.

The brighteners according to the invention can be symmetrically or unsymmetrically constructed with respect to the X and V groups as well as with respect to the Y and Z groups. In the symmetrical compounds X is the same as V, and Y is the same as Z. In the unsymmetrical compounds, e.g. X may be identical with V, and Y different from Z, or Y may be the same as Z and X different from V, or X, Y, Z and V may be different from each other.

The symmetrical compounds are obtained by condensing, in any desired order of succession, preferably in a solvent and/or in the presence of a dispersing agent in aqueous medium, at 0–10° C. two mols of cyanuric chloride with one mol of 4,4'-diaminostilbene-2,2'-disulfonic acid or a water-soluble salt thereof, to produce the 4,4'-bis - (2,4 - dichloro - 1,3,5 - triazyl - (6) - amino) - stilbene-2,2'-disulfonic acid or corresponding salt, and condensing the latter at 20–50° C. with two mols of a base of formula V—H and at 80–100° C. with two mols of a base of formula Y—H or Z—H, in which formulae Y, Z and V have the precedingly indicated significances. The HCl liberated in the condensation is neutralized with alkali, e.g. alkali metal hydroxide, alkali metal carbonate, alkali metal acetate, etc.

Asymmetrical compounds are conveniently prepared by reacting one mol of cyanuric chloride at 0–10° C. with one mol of 4-nitro-4'-aminostilbene-2,2'-disulfonic acid, at 20–50° C. with one mol of a base of formula X—H and at 80–100° C. with one mol of a base of formula Y—H, reducing the nitro group to amino, and reacting one mol of the so-obtained amine with one mol of cyanuric chloride at 0–10° C. and one mol of the resultant condensation product at 20–50° C. with one mol of a base of formula V—H and finally at 80–100° C. with one mol of a base of formula Z—H. The order in which the bases of formulae X—H, Y—H, Z—H and V—H are brought into reaction can be varied as desired.

The compounds as thus prepared can be isolated by salting out, precipitation with acid, or by evaporation of the reaction mixture.

Particularly suitable compounds are for example those in the molecule of which the amino groups X, Y and Z are the radicals of primary aliphatic amines such as methylamine, ethylamine, propylamine, isopropylamine, butyl-

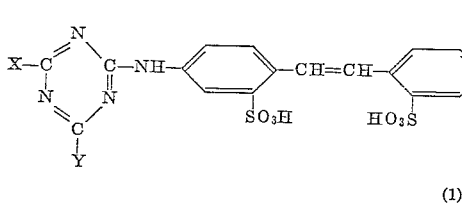

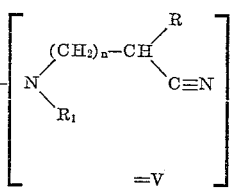

amine, isobutylamine, ethanolamine, isopropanolamine, γ-hydroxypropylamine, β-cyanoethylamine, β-cyanopropylamine, β-methoxyethylamine, etc., the radicals of secondary aliphatic amines such as dimethylamine, diethylamine, dipropylamine, dibutylamine, diethanolamine, methyl-(β-hydroxyethyl)-amine, ethyl-(β-hydroxyethyl)-amine, diisopropanolamine, dibutanolamine, etc., the radicals of heterocyclic amines such as morpholine, piperidine, pyrrolidine, etc., the radicals of primary and secondary aromatic amines such as aniline, o- and p-anisidine, chloraniline, toluidines, anilinesulfonic acids such as metanilic acid, orthanilic acid and sulfanilic acid, anisidinesulfonic acids, toluidinesulfonic acids, anilinedisulfonic acids, as well as the corresponding sulfonamides of the enumerated sulfonic acids, also the radicals of aliphatic aminosulfonic acids, such as aminomethanesulfonic acid, taurine, methyltaurine, etc., and also the $NH_2$ group itself. In this connection, $R_1$ (referring to Formula I, supra) is H, a lower alkyl group such as methyl, ethyl, etc., a cyanoalkyl group such as β-cyanoethyl, β-cyanopropyl, etc., or preferably an oxyalkyl group such as β-hydroxyethyl, β-hydroxypropyl, γ-hydroxypropyl, β-methoxyethyl, β-ethoxyethyl, etc., and those in the molecule of which the aminogroups X or X, Y and Z are identical with V.

The amines which contain the

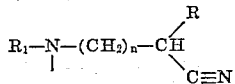

group in the molecule are readily prepared in per se known manner; thus e.g. those wherein $n$ is 1 are prepared from bases $R_1$—$NH_2$ and acrylonitrile or methacrylonitrile, and those wherein $n$ is zero are prepared from bases $R_1$—$NH_2$ and hydroxycarboxylic acid nitriles or from α-aminoalkylsulfonic acids and alkali metal cyanides.

Although the brighteners of the invention are especially useful in the "size press," as already indicated, and in this respect alone are markedly distinguished from similarly constructed brighteners which do not contain the cyanoalkyl group in the molecule thereof, the new brighteners are also useful in other applications. Thus, they are valuable products for the optical brighening of paper pulp in the Hollander, and they are also useful for the white toning of textiles from cotton, viscose, nylon, wool, etc.

The new brighteners may be employed individually or in admixture and also in combination with other brighteners and with finishing agents, e.g. synthetic resin finishes on the basis of carbamide-formaldehyde precondensates, such as dimethylolurea or methylolmelamines or polymers of the vinyl, acrylic and styrene series, and also in the presence of surface-active materials such as washing and wetting agents. They can also be added to spinning masses.

In comparison with known brighteners which contain no cyanoalkyl group in the molecule, they present the following advantages: they are better soluble, more resistant to acid, faster to light and have superior levelling capacity.

In the following examples, setting forth presently preferred exemplary embodiments of the invention, the parts are parts by weight, the percentages are by weight, and the temperatures are in degrees centigrade.

*Example 1*

A solution of 190 parts of cyanuric chloride in 800 parts of acetone is stirred, in the course of 10 minutes, into 2000 parts of ice water. Into the resultant suspension, there is stirred dropwise in the course of one hour at 0–5° a solution of 185 parts of 4,4'-diaminostilbene-2,2'-disulfonic acid and 106 parts of calcined sodium carbonate in 1500 parts of water. Then, after primary aromatic amino groups are no longer detectable, a solution of 74 parts of β-cyanoethylamine in 150 parts of water is stirred in, and the obtained mixture heated to 40° for 2 hours, the pH being maintained at between 6.5 and 7.0 by the addition of a solution of 40 parts of sodium hydroxide in 360 parts of water. A solution of 74 parts of β-cyanoethylamine in 150 parts of water is then again added, and the mixture heated to 95–100° for 5 hours, whereby the acetone is distilled off; the HCl liberated during the reaction is continuously neutralized by the gradual addition of 400 parts of 10% aqueous sodium hydroxide solution.

The reaction mixture is diluted to 10,000 parts with water and is then acidified at 50° by the addition of 240 parts of hydrochloric acid 1:1 (1 part by volume of concentrated hydrochloric acid+1 part by volume of water), after which the precipitated acid is filtered off with suction. This is then suspended in 2500 parts of water at 50° and is neutralized by the addition of 400 parts of 10% aqueous sodium hydroxide solution, the resultant solution filtered and evaporated to dryness under reduced pressure.

The so-obtained sodium 4,4'-bis-(2-β-cyanoethylamino-4 - β - cyanoethylamino - 1,3,5 - triazyl - (6) - amino - stilbene-2,2'-disulfonate is a bright yellow powder which is readily soluble in water. It is a valuable brightener, which imparts a beautiful light-fast brightening to paper, when applied to the pulp or by surface treatment. The product is stable to acids and to aluminum sulfate. Applied to paper, it is several times more effective than the corresponding sodium 4,4'-bis-(2,4-diamino-1,3,5-triazyl-(6)-amino)-stilbene-2,2'-disulfonate which contains no cyanoethyl group in the molecule.

A brightener of like properties is obtained when, in the foregoing, the 74 parts of β-cyanoethylamine reacted at 95–100°, are replaced by 129 parts of β,β'-dicyanodiethylamine.

*Example 2*

A solution of 120 parts of β-cyanoethyl-(β'-hydroxyethyl)-amine in 200 parts of water is stirred at 20° into a suspension, prepared according to Example 1, of 355 parts of sodium 4,4'-bis-(2,4-dichloro-1,3,5-triazyl-(6)-amino)-stilbene-2,2'-disulfonate in 2000 parts of water and 800 parts of acetone. The mixture is warmed to 40–45° for 4 hours with constant neutralization to a pH of 7 by means of a total of 400 parts of 10% aqueous sodium hydroxide solution. Thereupon a solution of 120 parts of β-cyanoethyl-(β'-hydroxyethyl)-amine in 200 parts of water is again added, the mixture is heated to 95–100° under a descending condenser, while gradually dropping in 400 parts of 10% aqueous sodium hydroxide solution at such a rate that the pH remains at 7.5 to 8.5. The clear reaction solution is diluted to 3500 parts with water. 525 parts of sodium chloride are then added at 60°, the precipitated product suction-filtered off at 20° and dried under reduced pressure.

The said product is a valuable brightener, especially for paper, and is stable to acid as well as aluminum sulfate. Used in the "size press" on sized paper at 2 grams per liter at pH 6, it produces very good brightening. In sharp contrast, the corresponding compound which, instead of the β-cyanoethyl-(β'-hydroxyethyl)-amino groups, contains only β-hydroxyethylamino groups, cannot be applied to this use, since it does not brighten the paper at all but imparts a greenish discoloration thereto.

The β-cyanoethyl-(β-hydroxyethyl)-amine, added at 20°, can in the precedingly described process of this example be replaced by 114 parts of β-cyanoethyl-(β-hydroxypropyl)-amine, and the subsequently added first-mentioned amine by 105 parts of diethanolamine, thereby yielding a brightener of properties like those of the initially-described product.

*Example 3*

A solution of 173 parts of metanilic acid in 500 parts of water, neutralized to pH 7.5 with sodium carbonate, is stirred at 10° in the course of 10 minutes into a suspension of 355 parts of sodium 4,4'-bis-(2,4-dichloro-1,3,5-triazyl-(6)-amino)-stilbene-2,2'-disulfonate in 2000 parts of water and 800 parts of acetone. The mixture is heated to 40° and kept at this temperature for 2 hours. Care is taken by the dropwise addition of 200 parts of 20% aqueous sodium hydroxide solution that the liberated hydrochloric acid is constantly neutralized and the pH value of the reaction mixture remains between 6 and 7.

114 parts of β-cyanoethyl-(β'-hydroxyethyl)-amine are then added and the solution is heated to 100° under a descending condenser for 5 hours, during which time 200 parts of 20% aqueous sodium hydroxide solution are added dropwise at such rate that pH remains between 7.5 and 8.5. The solution is then filtered and evaporated to dryness under reduced pressure.

The so-obtained bright yellow powder, which consists of about 75% sodium 4,4'-bis-(2-m-sulfophenylamino-4-β-cyanoethyl-β'-hydroxyethylamino-1,3,5-triazyl-(6)-amino)-stilbene-2,2'-disulfonate and about 25% sodium chloride, can be purified by dissolution in the ten-fold quantity of hot water and salting out with 15% aqueous sodium chloride solution.

The product is a valuable brightening agent, especially for paper. It can be used in the Hollander, in the immersion or spraying process. Particularly in the "size press" application, with sized paper having a surface pH of about 6, it is greatly superior to the corresponding compound which contains in its molecule e.g. a hydrogen atom in place of the cyanoethyl group.

A brightener of like properties as that produced according to the present example is obtained if, in the foregoing, the 114 parts of β-cyanoethyl-(β'-hydroxyethyl)-amine are replaced by 126 parts of β-cyanoethyl-(β'-hydroxypropyl)-amine, or if the metanilic acid is replaced by the same quantity of sulfanilic acid.

*Examples 4 to 21*

355 parts (0.5 mol) of sodium 4,4'-bis-(2,4-dichloro-1,3,5-triazyl-(6)-amino)-stilbene-2,2'-disulfonate prepared from 1 mol of cyanuric chloride and 0.5 mol of 4,4'-diaminostilbene-2,2'-disulfonic acid are reacted, in the manner described in Example 3, at 35–45° with one mol of the amine X—H and at 95–100° with one mol of the amine X'—H, the specific X—H and X'—H amines being those set forth in the table which follows:

| Example No. | Amine X—H | Amine X'—H |
| --- | --- | --- |
| 4 | β-cyanoethyl-(β'-hydroxypropyl)-amine. | ammonia. |
| 5 | ___do___ | monoethanolamine. |
| 6 | ___do___ | morpholine. |
| 7 | β-cyanoethyl-(β'-hydroxyethyl)-amine. | 1-amino-3-propanol. |
| 8 | β-cyanoethyl-(β-hydroxypropyl)-amine. | methyl-(β-hydroxyethyl)-amine. |
| 9 | β,β'-dicyanodiethylamine. | 1-amino-2-propanol. |
| 10 | ___do___ | ethylamine. |
| 11 | aniline. | β-cyanoethyl-(γ-hydroxypropyl)-amine. |
| 12 | ammonia. | N-β-cyanoethyl-p-methoxyaniline. |
| 13 | metanilic acid. | β-cyanoethylamine. |
| 14 | orthanilic acid. | ethyl-(β-cyanopropyl)-amine. |
| 15 | sulfanilic acid. | β,β'-dicyanodipropylamine. |
| 16 | 2-amino-1-methylbenzene-5-sulfonic acid. | β-cyanoethyl-(β'-hydroxypropyl)-amine. |
| 17 | 2-amino-1-methoxybenzene-4-sulfonic acid. | Do. |
| 18 | metanilic acid. | β-cyanoethyl-(β-methoxyethyl)-amine. |
| 19 | N-methyltaurine. | cyanomethylamine. |
| 20 | metanilic acid. | α-cyanoethylamine. |
| 21 | sulfanilic acid. | cyanomethyl-(β-hydroxyethyl)-amine. |

*Example 22*

A solution of 770 parts of sodium 4'-amino-4-(2"-m-sulfophenylamino-4"-morpholino-1",3",5"-triazyl-(6"))-amino stilbene-2,2'-disulfonate and 53 parts of calcined sodium carbonate in 10000 parts of water is stirred dropwise at 0–5° in the course of half an hour into a suspension of 185 parts of cyanuric chloride in 800 parts of acetone and 2000 parts of ice water (cf. Example 1).

At the end of fifteen minutes, primary aromatic amino groups are no longer detectable. 128 parts of β-cyanoethyl-(β'-hydroxypropyl)-amine in solution in 300 parts of water are then added, after which the mixture is heated to 45° for 3 hours while adding a total of 800 parts of 5% aqueous sodium hydroxide solution. 128 parts of β-cyanoethyl-(β'-hydroxypropyl)-amine in solution in 300 parts of water are then again added, the temperature raised to 95° and, at this temperature, 800 parts of 5% aqueous sodium hydroxide solution added dropwise in the course of 2 hours. The resultant mixture is stirred for 2 hours at 95–100°, after which it is evaporated to dryness in a spray dryer.

The so-obtained brightener which, apart from a small quantity of sodium chloride, consists of sodium 4'-(2'''-β-cyanoethyl-β'-hydroxypropyl-amino-4''''-β-cyanoethyl-β'-hydroxypropylamino-1''',3''',5'''-triazyl-(6''')-amino-4-(2,2'-m-sulfophenylamino-4''-morpholino-1'',3'',5''-triazyl-(6'')-aminostilbene-2,2'-disulfonate, and is especially suitable for the brightening of paper.

The starting compound can be prepared in known manner from one mol each of 4'-nitro-4-aminostilbene-2,2'-disulfonic acid, cyanuric chloride, metanilic acid and morpholine, with reduction of the nitro group.

The β-cyanoethyl-(β'-hydroxypropyl)-amine (128 parts) reacted at 45° can be replaced by 114 parts of β-cyanoethyl-(β'-hydroxyethyl)-amine, and the second portion of the first-named amine by 87 parts of morpholine, while otherwise proceeding as set forth in this example, whereby a brightener with properties similar to those of the product described in the first paragraph are obtained.

*Example 23*

Undyed paper pulp of bleached sulfite cellulose is beaten in a Hollander at a density of 2.5%. To the resultant mass, there is added 0.1% (relative to the dry weight) of the first brightener described in Example 1, in solution in a small quantity of water, and beating continued for 15 more minutes. Then 2% (relative to the weight of the dry fiber) of colophony as 2% rosin milk ("Harzmilch") and 3% (also relative to the weight of the dry fiber) of aluminum sulfate as a 10% aqueous solution are added. The pulp is diluted with water to a material density of 0.5% and paper sheets poured from this mass. These sheets, after drying, are strongly brightened. The corresponding compound which contains an NH₂ group in the molecule in lieu of the cyanoethylamino group is unsuitable for the indicated purpose.

The compounds of Examples 2 to 22 can be used in like manner.

*Example 24*

A dry paper web, sized with 2% (relative to the weight of the dry fiber) rosin milk and 3% aluminum sulfate and having a surface pH of 4.5, is passed through a Foulard in which, for about 3 seconds, it is immersed in an aqueous solution which contains 50 grams per liter of dextrine and 1 gram of the brightener of Example 13 and has a pH of 6, and is then squeezed down to about 150%. The paper, after being dried at 100°, is distinctly brightened. A like brightening effect can be obtained with the brighteners disclosed in Examples 1 to 12 and 14 to 19.

*Example 25*

A fabric of bleached cotton poplin is treated, at a goods-to-liquor ratio of 1:30 and at 40°, for 30 minutes, in a bath containing, per liter, 5 milligrams of the brightener first-described in Example 3 and 5 grams of calcined Glauber's salt. After being rinsed and dried, the fabric is distinctly brightened.

*Example 26*

Undyed raw woolen yarn, reinforced with nylon, is moved about for 30 minutes at 70° at a goods-to-liquor ratio of 1:4, in a bath containing per liter 50 milligrams of the first-described brightened of Example 2 and 1 gram of glacial acetic acid. The yarn, after drying, has a distinctly brightened appearance.

Example 27

A web of undyed cotton cretonne is impregnated in a Foulard with a solution which contains, per liter, 150 grams of a urea-formaldehyde precondensate, 2 grams of ammonium sulfate and 0.05 gram of the brightener of Example 16, then squeezed down to 100%, pre-dried at 80°, and thereafter aftercondensed at 120°. The thus crease-proofed fabric is distinctly brightened.

A like brightening effect is achieved with the brighteners of Examples 1 to 15 and 17 to 22.

For the sake of completeness, it is noteworthy that no significance is attached to the fact that the foregoing illustrative examples happen to employ the compounds I in the form of the di-sodium salts. M (see the formula of claim 3) represents any cation, including H, but preferably—and solely because of easy accessibility of the correspondin compounds—alkali metal cations. Here again, the preferred cation M is Na, although the K salts are essentially equivalent to the Na salts.

Having thus disclosed the invention, what is claimed is:

1. A water-soluble compound of the formula

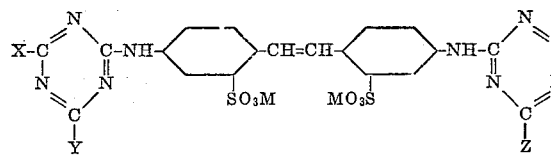

wherein the substituents V, X, Y and Z are amine radicals each of which is attached by its amino nitrogen atom to the respective triazine ring, and at least one of which substituents has the formula

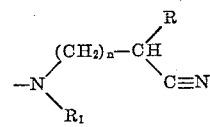

R is a member selected from the group consisting of hydrogen and methyl; $R_1$ is a member selected from the group consisting of hydrogen, alkyl, hydroxyalkyl, cyanoalkyl and alkoxyalkyl, each of the last four members having at most 4 carbon atoms; $n$ is an integer ranging from 0 to 1; and M is a cation selected from the group consisting of hydrogen and alkali metal cations; remaining substituents being amine radicals selected from the group consisting of —$NH_2$, unsubstituted primary and secondary lower alkyl-amino, hydroxy-lower alkyl-amino, cyano-lower alkyl-amino, sulfo-lower alkyl-amino, alkoxyalkyl-amino having a total of 3 to 4 carbon atoms, morpholino, piperidino, pyrrolidino, anilino, chloroanilino, toluidino, o- and p-anisidino, sulfoanilino, sulfoanisidino, sulfotoluidino, sulfonamido-anilino, sulfonamido-anisidino and sulfonamido-toluidino.

2. Sodium 4,4′-bis-(2-β-cyanoethylamino-4-β-cyanoethylamino - 1,3,5 - triazyl - (6) - amino) - stilbene - 2,2′-disulfonate.

3. Sodium 4,4′-bis-(2-β,β′-dicyanodiethylamino-4-β,β′-dicyanodiethylamino - 1,3,5 - triazyl-(6)-amino)-stilbene-2,2′-disulfonate.

4. Sodium 4,4′-bis-[2-β-cyanoethyl-(β-hydroxypropyl)-amino - 4 - β-cyanoethyl-(β-hydroxypropyl)-amino-1,3,5-triazyl-(6)-amino]-stilbene-2,2′-disulfonate.

5. A compound of the formula

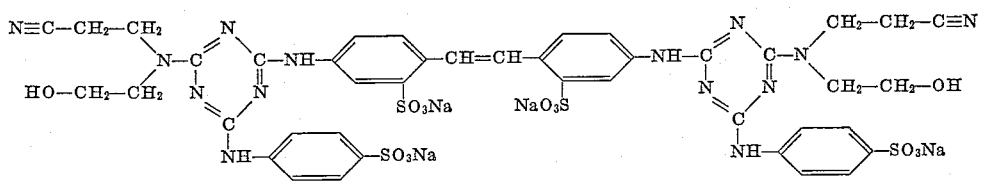

6. A compound of the formula

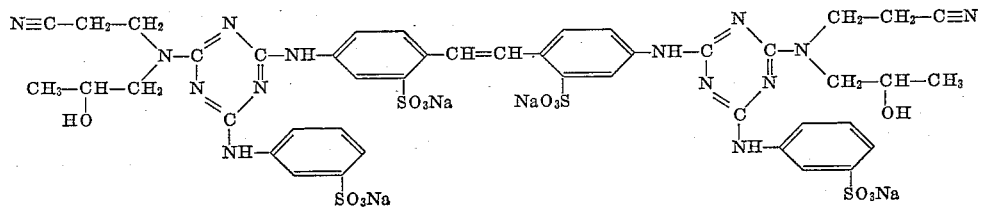

7. A compound of the formula

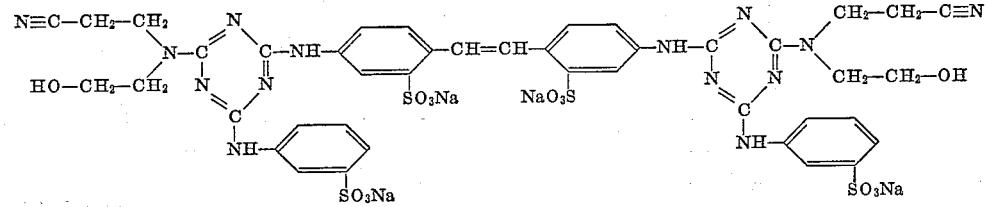

8. A compound of the formula

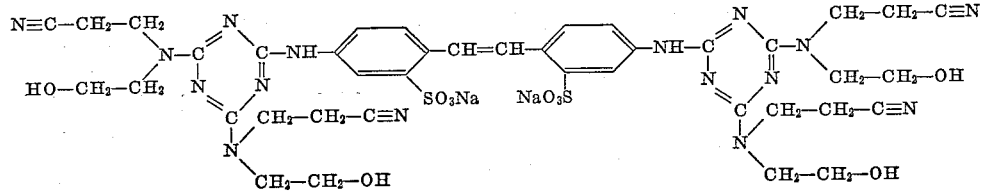

9. A compound of the formula
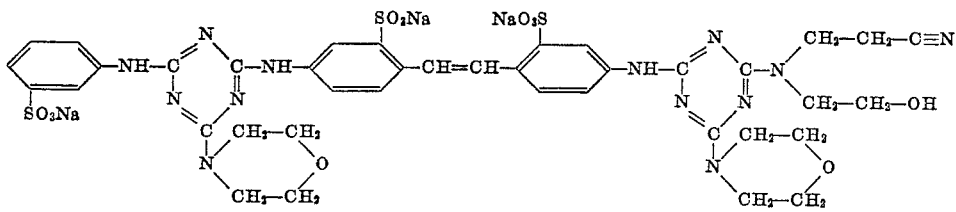
References Cited in the file of this patent
UNITED STATES PATENTS
| | | |
|---|---|---|
| 2,376,743 | Wendt | May 22, 1945 |
| 2,618,636 | Williams et al. | Nov. 18, 1952 |
| 2,666,052 | Williams et al. | Jan. 12, 1954 |
| 2,762,801 | Hausermann | Sept. 11, 1956 |
| 2,766,239 | Fleck | Oct. 9, 1956 |
| 2,901,477 | Siegel et al. | Aug. 25, 1959 |
| 2,945,762 | Carroll et al. | July 19, 1960 |
| 2,956,898 | Fleck | Oct. 18, 1960 |
FOREIGN PATENTS
| | | |
|---|---|---|
| 541,278 | Canada | May 21, 1957 |
| 705,406 | Great Britain | Mar. 10, 1954 |